United States Patent

Stelzer

[15] 3,649,084
[45] Mar. 14, 1972

[54] LOAD CONTROLLED BRAKE PROPORTIONING VALVE

[72] Inventor: William Stelzer, Milford, Mich.
[73] Assignee: Kelsey-Hayes Company, Romulus, Mich.
[22] Filed: Oct. 13, 1969
[21] Appl. No.: 865,572

[52] U.S. Cl. ..........................303/22 R, 188/349, 303/6 C
[51] Int. Cl. ..........................................................B60t 8/26
[58] Field of Search ............................303/6, 6 C, 22, 27 A; 60/545 E; 188/152, 152.11

[56] References Cited

UNITED STATES PATENTS

| | | | |
|---|---|---|---|
| 3,237,997 | 3/1966 | Kerr | 303/22 |
| 3,379,479 | 4/1968 | Lepelletier | 303/22 |
| 3,501,203 | 3/1970 | Falk | 303/22 A X |
| 3,508,792 | 4/1970 | Bueler | 303/22 A X |

Primary Examiner—Milton Buchler
Assistant Examiner—John J. McLaughlin
Attorney—Harness, Dickey & Pierce

[57] ABSTRACT

A proportioning valve which is operable to provide proportioning between inlet and outlet pressures at a first ratio (other than 1:1) and subsequently at a preselected pressure to proportion at a second different ratio with the valve being adaptable to be sensitive to load, i.e., the weight carried by the rear axle.

22 Claims, 2 Drawing Figures

Patented March 14, 1972 3,649,084
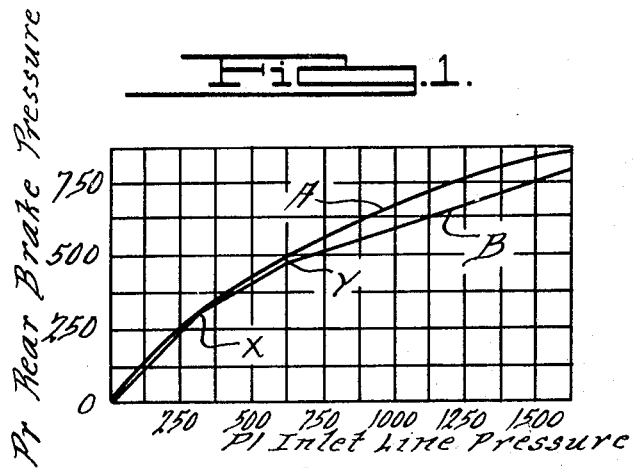
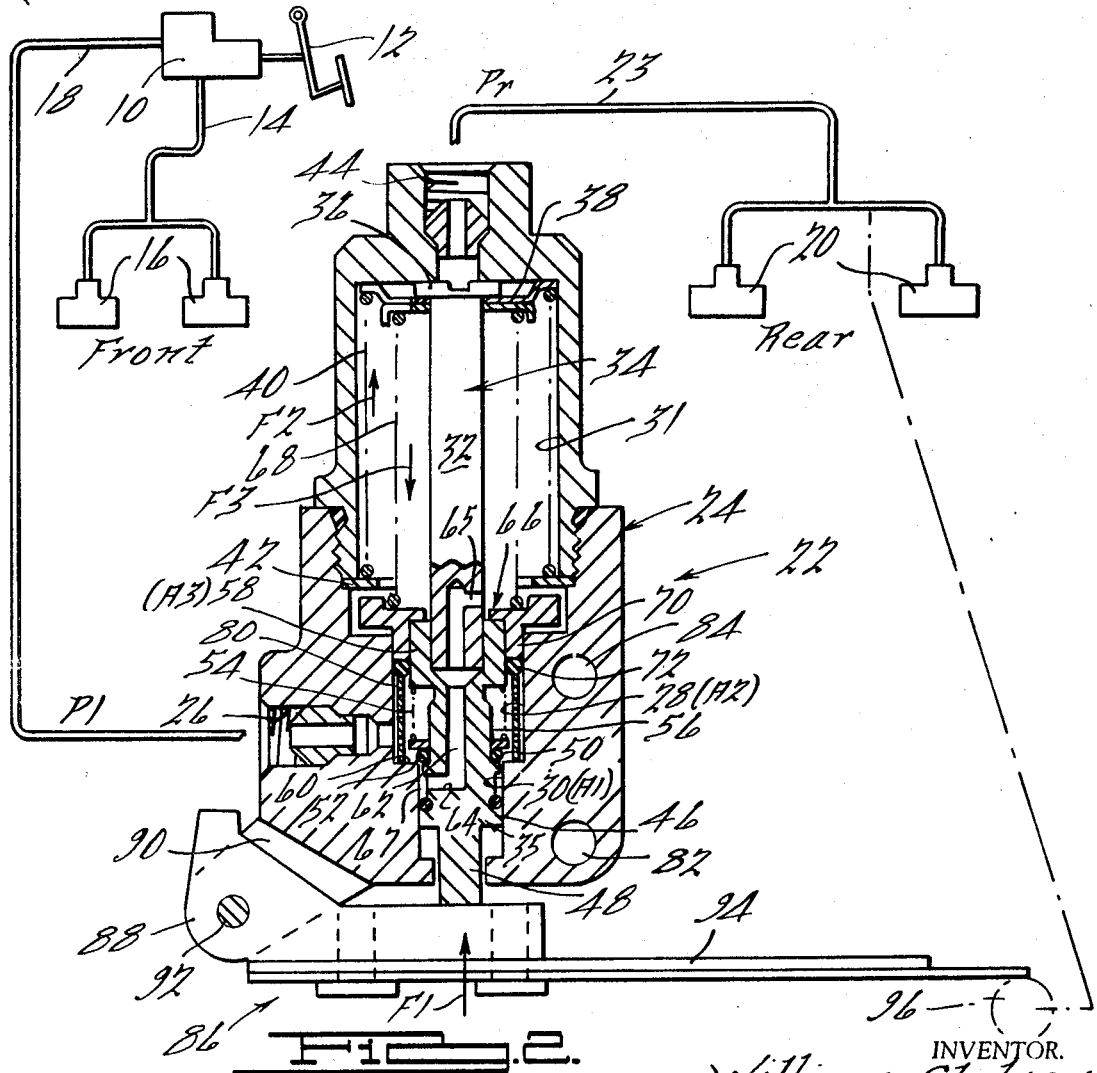
INVENTOR.
William Stelzer
BY
Harness, Dickey & Pierce
ATTORNEYS.

LOAD CONTROLLED BRAKE PROPORTIONING VALVE

SUMMARY BACKGROUND OF THE INVENTION

The present invention relates to proportioning valves.

In conventional proportioning valves, the effect of weight transferred from the rear wheels is compensated such that upon the attainment of a selected level of input pressure from the master cylinder whereby further pressure increases to the rear brakes occur at a preselected ratio. This operates to prevent premature lockup of the rear wheels during braking as weight is transferred from the rear wheels to the front wheels. An idealized curve depicting the relationship between input pressure from the master cylinder and pressure to the rear brakes can be constructed with the curve indicating the desired compensation for weight transfer. In some applications, it has been found that there can be a substantial deviation between the actual performance curves of conventional proportioning valves and the idealized curve. In the present invention has been found that the idealized curve can more nearly be approximated by the use of a two stage proportioning valve in which the proportioning initially begins at a preselected pressure and at a first ratio up to a second preselected pressure at which proportioning then occurs at a second lower ratio.

Therefore it is an object of the present invention to provide a proportioning valve which is multistaged in operation to provide two different ratios of proportioning.

The valve of the present invention can be readily adapted to be load sensitive such that proportioning will reflect more nearly the weight transfer from the rear wheels to the front wheels. Therefore, it is another object of the present invention to provide a two stage proportioning valve which is load sensitive. It is another general object of the present invention to provide a novel proportioning valve.

Other objects, features and advantages of the present invention will become apparent from the subsequent description and the appended claims, taken in conjunction with the accompanying drawings, in which:

FIG. 1 is a curve depicting the relationship between line pressure and rear brake pressure showing idealized condition and showing performance of the proportioning valve of the present invention.

FIG. 2 is a partial schematic diagram with the proportioning valve of the present invention shown partially in section and exemplifying features of the present invention.

Looking now to FIG. 1 curve A depicts the idealized relationship between input pressure and rear brake pressure under a selected load condition. Curve B depicts the performance of the proportioning valve of the present invention which closely approximates curve A.

Looking now to FIG. 2, the brake system for an automotive vehicle includes a conventional dual, master cylinder 10 which is actuable means of a brake pedal 12, A first fluid line 14 communicates one chamber of master cylinder 10 to the front wheel brakes 16 and a second fluid line 18 communicates the other chamber of master cylinder 10 to the rear brakes 20 via a proportioning valve 22 and outlet line 23.

The proportioning valve 22 has a housing assembly 24 which has a transversely extending inlet port 26 connected to the fluid line 18. The port 26 is in communication with a generally axially extending stepped bore having bore portions 28, 30 and 31. A plunger 32 which is also the stepped construction is slidably supported within the bore portions 28, 30 and 31. Plunger 32 is of a two piece construction and has an upper member 34 fixed to the upper end of lower member 35. The upper end of member 32 terminates in a slotted head 36 which is engaged by a perforate generally annular spring retainer 38. A spring member 40 has one end engaging the spring seat 38 and its opposite end engaging a snap ring 42 located in the bore portion 31. Spring 40 is biased to normally urge the plunger 32 to its upper most position as shown in FIG. 2. The slotted head 36 and perforate seat 38 permit fluid flow from bore portion 31 to an outlet passage 44 which is connected to the fluid line 23.

The lower, small end 46 of the plunger 32 is slidably and sealingly located within the small diameter bore portion 30. A reduced diameter rod portion 48 extends outwardly beyond the lower portion of the housing assembly 24.

The small end portion 46 terminates in a shoulder 50 against which an annular seal 52 is normally urged by a spring and washer assembly 54. The shoulder 50 is defined by an undercut portion 56 between the small end 46 and a large diameter portion 58 of the plunger 32. Normally the shoulder 50 is in line with a shoulder 60 which is defined by the juncture between the bore portions 28 and 30 and in this position locates the seal 52 out of sealing engagement with the bore portion 30. An axial passageway 62 extends through the plunger 32 and communicates the intermediate diameter portion 31 with the small diameter portion 30 via transversely extending ports 64 and 65. The port 64 is located in the small diameter portion 46 of the plunger 32 and faces the wall of the small bore portion 30. A clearance path 67 is provided between bore portion 30 and plunger portion 46 to communicate the transverse port 64 normally (in the position shown) with the inlet port 26; thus normally fluid can readily flow from master cylinder 10, line 18, port 26, clearance path 67, the port 64, passage 62, port 64 and into the bore portion 31, out port 44 into the fluid line 23 to the rear brakes 20.

A sleeve 6 is seated and slidably supported upon the large diameter portion 58 of the plunger 32. Sleeve 66 is of an increased diameter and is located below and proximate to the retaining washer 42 in the bore portion 31. A spring member 68 resiliently engages the sleeve 66 and the retainer 38 to normally urge the sleeve 66 onto the large diameter portion 58. The sleeve 66 has an annular flange 70 which is dimensioned to move in close clearance relationship between the larger portion 58 of the plunger 32 and the adjacent wall of the intermediate diameter portion 28. An annular seal 72 engages the lower end of the flange 70 to provide a seal between the large portion 58 of plunger 32 and the adjacent wall of the bore portion 28. A perforated generally annular seal retaining sleeve 80 serves to locate the seal 72.

The valve 22 is adapted to be mounted in a stationary position to a portion of the vehicle chassis via mounting holes 82 and 84. A load responsive assembly 86 includes a pivot member 88 which is pivotally secured to an ear 90 of the housing assembly 24 via a pivot 92. Assembly 86 includes a flat spring member 94 which is adapted to engage the rear axle housing generally indicated by the numeral 96. The position of the rear axle housing 96 will vary with the load on the rear wheels and hence the force of the spring 94 will be varied in accordance with this load. The pivot member 88 is constructed to engage the rod portion 48 of the plunger 32 to urge the plunger 32 to its uppermost position. In this regard, the force of the spring 94 complements the force of the spring 40.

In operation, fluid under pressure P1 from the master cylinder 10 and at line 18 is normally transmitted to the rear brakes 20 via the port 26, the intermediate bore portion 28, past the seal 52, the clearance path 67, through the transverse port 64, the passageway 62, the bore portion 31, the port 65, and out through the port 44 and fluid line 23. The proportioning valve 22 will maintain this position as the pressure P1 and hence the pressure to the rear wheel Pr is increased from 0 to point X on the curve B; this follows a straight line relationship. Point x is selected to intersect the idealized cure A.

At the point X the pressure in the large bore portion 31 will be just equal to the force F1 of the spring 94 and the force F2 of the spring 40 tending to maintain the plunger 32 in its uppermost position. This relationship is shown in the following equation:

(1) $\quad P1 = F1 + F2$

Where A1 is the diameter of the small diameter bore portion 30.

When the point X is reached, the plunger 32 will then be moved downwardly to move the seal 52 into sealing engagement with the sidewall of the bore portion 30 and any further increases in pressure will be determined by the following relationship:

(2) $\quad P1(A2-A1) + F1 + F2 = Pr\, A2$ where A2 is the area of the intermediate bore portion 28. The result will be pressure Pr to the rear wheel brakes 20 in accordance with the following relationship:

$$Pr = \frac{P1(A2-A1) + F1 + F2}{A2} \quad (3)$$

It can be seen that the slope of the curve B following the point X can be selected by selecting the parameters A2, A1, F1, F2. Brake pressure Pr to the rear brakes will increase in accordance with the Equation (3) until the point Y is reached. At this point, the input pressure P1 acting upon the flange portion 70 of sleeve 66 (via seal 72) will be sufficient to overcome the force of the spring 68 whereby the sleeve 66 will be moved away from the plunger 32 and into engagement with the ring 42. This will occur at a point determined by the following:

$$(4) \quad (P1-Pr)(A2-A3) = F3,$$

where A3 is the cross sectional area of the larger diameter portion 58 and F3 is the force of the spring 68. After the point Y has been attained, further increases in pressure will occur in accordance with the following:

$$(5) \quad P1(A3-A1) + F1 + F2 + F3 = Pr A3$$

Further increases in pressure Pr with respect to input pressure P1 will occur in accordance with the following:

$$Pr = \frac{P1(A3-A1) + F1 + F2 + F3}{A3} \quad (6)$$

The slope of the curve B following the point Y can be as shown in FIG. 1 and will of course, be determined by the parameters A1, A3, F1, F2 and F3. Thus it can be seen that the proportioning valve 22 will provide a relationship between pressure Pr to the rear brakes and input pressure P1 in accordance with the Curve B which will closely simulate the shape of the idealized Curve A. It can also be seen that the proportioning valve 22 will be sensitive to the loading of the rear axle 96 since the magnitude of force F1 will vary with the rear axle load.

During decreasing pressures as the pressure in master cylinder 10 is reduced, the rear line pressure Pr will decrease along the same curve B upon which it went increased. In this case, the plunger 32 will descend drawing fluid from the rear line which will permit a reduction in pressure; sleeve 66 will then when point Y is reached; next the plunger 32 will descent further; after the input and rear line pressures become equal, as at point X, fluid will return from the rear line to the master cylinder 10 by moving the seal 52 out of the way against the force of the light spring 54 whereby the proportioning valve 22 can return to the original position as shown in the drawing of FIG. 2.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an automotive vehicle having a pair of fluid actuated brake systems a proportioning valve for controlling the fluid pressure from a source to one of the systems, said proportioning valve comprising: housing means having an inlet and an outlet connected between the source and the one system, valve means including a plunger slidably supported in said housing means and having a seal movable therewith between said inlet and outlet and into and out of sealing relation with said inlet, first spring means for resiliently urging said plunger and said seal out of blocking relation with said inlet, a sleeve slidably supported in said housing means and normally resiliently held in working engagement with said plunger by second spring means, said valve means being actuable to a first condition in response to attainment of a first preselected magnitude of fluid pressure at said inlet for providing at said outlet fluid pressure increasing at a first selected ratio of the pressure at said inlet and actuable to a second condition in response to attainment of a second preselected magnitude of fluid pressure at said inlet for providing at said outlet fluid pressure increasing at a second selected ratio of the pressure at said inlet, said sleeve actuable with said plunger for placing said valve means in said first condition for operation at said first selected ratio and being deactuated from actuation with said plunger at said second preselected magnitude of fluid pressure for placing said valve means in said second condition for operation at said second selected ratio.

2. The proportioning valve of claim 1 with said housing means having a small diameter bore in communication with said inlet and a large diameter bore in communication with said outlet, said plunger having a small diameter portion located in said small bore and a large diameter portion located in said large bore, said sleeve having a flange portion located between said large bore and said large portion.

3. The proportioning valve of claim 2 with a fluid passage extending through said plunger to communicate said inlet and outlet, said fluid passage including a clearance between said small portion of said small bore, said seal being movable into said small bore during actuation in said first and second conditions to block flow into said clearance from said inlet.

4. The proportioning valve of claim 3 with said seal being movable in said plunger and being urged into sealing relation by first spring and being movable out of sealing relation in response to pressure at said outlet being greater at said inlet to function as a check valve.

5. The proportioning valve of claim 3 with said first resilient means including a second spring exerting a first force on said plunger relative to said housing means with the magnitude of said first force affecting said first and second preselected magnitudes of fluid pressure and said first and second ratios.

6. The proportioning valve of claim 5 with said second resilient means including a third spring exerting a second force on said sleeve relative to said plunger whereby said sleeve and plunger act together with the magnitude of said second force being overcome by fluid pressure on said sleeve exceeding said second preselected magnitude at which said sleeve is deactuated from said plunger.

7. The proportioning valve of claim 6 with said valve means including load means for providing a load force having a magnitude indicative of the load on the wheels associated with one system and being responsive to said load force for varying the magnitudes of said first and second preselected magnitudes in accordance with variations in the magnitude of the load on the wheels.

8. The proportioning valve of claim 7 with said load means comprising a fourth spring for providing said load force on said plunger relative to said housing means with the combined magnitudes of said first force and said load force affecting said first and second preselected magnitudes of fluid pressure and said first and second ratios.

9. The proportioning valve of claim 8 with said first preselected magnitude and said first ratio being affected by the effective areas of said large bore and said small bore and with said second preselected magnitude and said second ratio being affected by the effective areas of said large diameter portion and said small bore.

10. The proportioning valve of claim 9 with said seal being movable in said plunger and being urged into sealing relation by first spring and being movable out of sealing relation in response to pressure at said outlet being greater at said inlet to function as a check valve.

11. The proportioning valve of claim 6 with said first preselected magnitude and said first ratio being affected by the effective areas of said large bore and said small bore and with said second preselected magnitude and said second ratio being affected by the effective areas of said large diameter portion and said small bore.

12. In an automotive vehicle having a pair of fluid actuated brake systems a proportioning valve for controlling the fluid pressure from a source to one of the systems, said proportioning valve comprising: housing means having an inlet and an outlet connected between the source and the one system, valve means supported in said housing means between said inlet and outlet and actuable to a first condition in response to attainment of a first preselected magnitude of fluid pressure at said inlet for providing at said outlet fluid pressure increasing at a first selected ratio of the pressure at said inlet and actuable to a second condition in response to attainment of a second preselected magnitude of fluid pressure at said inlet for providing at said outlet fluid pressure increasing at a second selected ratio of the pressure at said inlet, load means for providing a load force having a magnitude indicative of the load on the wheels associated with one system and being responsive to said load force for varying the magnitudes of said first and second preselected magnitudes in accordance with variations in the magnitude of the load on the wheels, said valve means comprising plunger means comprising a plunger slidably supported in said housing means and a seal operatively connected with said plunger and movable with said plunger into and out of blocking relation with said inlet, first spring means for resiliently urging said plunger and said seal out of blocking relation with said inlet, said plunger means further comprising a sleeve slidably supported in said housing means and normally resiliently held in working engagement with said plunger by second spring means, said sleeve actuable with said plunger for placing said valve means in said first condition for operation at said first selected ratio and being deactuated from actuation with said plunger at said second preselected magnitude of fluid pressure for placing said valve means in said second condition for operation at said second selected ratio.

13. The proportioning valve of claim 12 with said housing means having a small diameter bore in communication with said inlet and a large diameter bore in communication with said outlet, said plunger having a small diameter portion located in said small bore and a large diameter portion located in said large bore, said sleeve having a flange portion located between said large bore and said large portion.

14. The proportioning valve of claim 13 with a fluid passage extending through said plunger to communicate said inlet and outlet, said fluid passage including a clearance between said small portion of said small bore, said seal being movable into said small bore during actuation in said first and second conditions to block flow into said clearance from said inlet.

15. The proportioning valve of claim 14 with said seal being movable in said plunger and being urged into sealing relation by first spring and being movable out of sealing relation in response to pressure at said outlet being greater at said inlet to function as a check valve.

16. The proportioning valve of claim 14 with said first resilient means including a second spring exerting a first force on said plunger relative to said housing means with the magnitude of said first force affecting said first and second preselected magnitudes of fluid pressure and said first and second ratios.

17. The proportioning valve of claim 16 with said second resilient means including a third spring exerting a second force on said sleeve relative to said plunger whereby said sleeve and plunger act together with the magnitude of said second force being overcome by fluid pressure on said sleeve exceeding said second preselected magnitude at which said sleeve is deactuated from said plunger.

18. The proportioning valve of claim 17 with said valve means including load means for providing a load force having a magnitude indicative of the load on the wheels associated with one system and being responsive to said load force for varying the magnitudes of said first and second preselected magnitudes in accordance with variations in the magnitude of the load on the wheels.

19. The proportioning valve of claim 18 with said load means comprising a fourth spring for proving said load force on said plunger relative to said housing means with the combined magnitudes of said first force and said load force affecting said first and second preselected magnitudes of fluid pressure and said first and second ratios.

20. The proportioning valve of claim 19 with said first preselected magnitude and said first ratio being affected by the effective areas of said large bore and said small bore and with said second preselected magnitude and said second ratio being affected by the effective areas of said large diameter portion and said small bore.

21. The proportioning valve of claim 20 with said seal being movable in said plunger and being urged into sealing relation by first spring and being movable out of sealing relation in response to pressure at said outlet being greater at said inlet to function as a check valve.

22. The proportioning valve of claim 17 with said first preselected magnitude and said first ratio being affected by the effective areas of said large bore and said small bore and with said second preselected magnitude and said second ratio being affected by the effective areas of said large diameter portion and said small bore.

* * * * *

UNITED STATES PATENT OFFICE
CERTIFICATE OF CORRECTION

Patent No. 3,649,084                    Dated  March 14, 1972

Inventor(s) William Stelzer

It is certified that error appears in the above-identified patent and that said Letters Patent are hereby corrected as shown below:

Column 1, line 70, "and" (second occurrence) should be -- end --; column 2, line 25, "6" should be -- 66 --; line 61, "x" should be -- X --; line 67, after "P1" insert -- A1 --, column 3, line 5, (3) should be prior to "Pr"; line 26, (6) should be prior to "Pr".

Signed and sealed this 5th day of September 1972.

(SEAL)
Attest:

EDWARD M.FLETCHER,JR.              ROBERT GOTTSCHALK
Attesting Officer                  Commissioner of Patents